United States Patent [19]

Naito et al.

[11] 4,415,364

[45] Nov. 15, 1983

[54] ONE-PACKAGE INORGANIC BINDER COMPOSITION

[75] Inventors: Hiroyuki Naito, Tokyo; Takashi Maruya; Masaaki Sugawara, both of Tsuruoka, all of Japan

[73] Assignee: Mizusawa Industrial Chemicals Ltd., Osaka, Japan

[21] Appl. No.: 391,720

[22] Filed: Jun. 24, 1982

[30] Foreign Application Priority Data

Jun. 25, 1981 [JP] Japan ................... 56-97558

[51] Int. Cl.$^3$ .................................. C04B 19/04
[52] U.S. Cl. ........................... 106/74; 106/84
[58] Field of Search ........................ 106/74, 84

[56] References Cited

U.S. PATENT DOCUMENTS 4,018,616 4/1977 Sugahara et al. ............ 106/74
4,171,986 10/1979 Freyhold et al. ............ 106/74

Primary Examiner—James Poer
Attorney, Agent, or Firm—Sherman & Shalloway

[57] ABSTRACT

Disclosed is a one-package inorganic binder composition comprising a powdery mixture of a powdery alkali metal silicate having a water solubility or water dispersibility, an alkali metal borate soluble in an alkaline aqueous solution and silicon polyphosphate.

8 Claims, 1 Drawing Figure

ONE-PACKAGE INORGANIC BINDER COMPOSITION

BACKGROUND OF THE INVENTION (1) Field of the Invention:

The present invention relates to a one-package inorganic binder composition. More particularly, the present invention relates to an inorganic binder composition which contains a binder component and a curing agent component in one package and which is used as a binder in various fields by addition of water on application. Especially, the present invention relates to an inorganic binder composition which is excellent in the storage stability though it is in the form of one package and also is excellent in the properties required for binders, such as the adhesive force and water resistance.

(2) Description of the Prior Art:

As the inorganic coating composition, there has been used a composition comprising as the main component a water-soluble silicate, such as so-called water glass. A water-soluble silicate such as water glass forms an aqueous solution having a high close contact property and a high adhesion, and this aqueous solution can easily be applied to a substrate to be bonded or coated. However, this aqueous solution is defective in that a long time is necessary for curing the coating, the form-retaining property or dimension stability of the coating is poor and so-called sagging is readily caused, and the resulting cured coating is insufficient in such properties as water resistance, weatherability and toughness. As means for improving these properties, there has widely been adopted method in which an acid or acidic salt is added as a curing agent to an aqueous solution of a water-soluble silicate. However, since this curing agent has a high reactivity with the silicate as the binder, premature gelation of the silicate or heterogeneous partial gelation is readily caused, the adaptability to the bonding or coating operation is not good, and the resulting cured coating is still insufficient in the water resistance, toughness and weatherability.

As means for preventing premature or partial gelation in a binder composition comprising an alkali metal silicate binder and an inorganic phosphate curing agent, we previously proposed a method in which a curing agent composed mainly of silicon polyphosphate having a property of gradually releasing phosphoric acid or an alkali metal salt thereof is used as the curing agent to prolong the pot life of the binder composition (see the specification U.S. Pat. No. 4,018,616).

This silicon polyphosphate type curing agent gives a much longer pot life to an alkali metal silicate binder than the conventional phosphoric acid type curing agent. However, this binder composition is defective in that a liquid (an aqueous solution of an alkali metal silicate) and a powder (silicon polyphosphate) should be metered independently and mixed on application.

SUMMARY OF THE INVENTION

We found that a powdery mixture comprising a powder of an alkali metal silicate, an alkali metal borate soluble in an alkaline aqueous solution and silicon polyphosphate is a one-package inorganic binder composition which can be used in various fields when the composition is mixed with water on application and which has an appropriate pot life and an appropriate self-curing property.

It is therefore a primary object of the present invention to provide a one-package inorganic binder composition in which a binder component and a curing agent are co-present in the powdery form.

Another object of the present invention is to provide a powdery one-package inorganic binder composition which has an excellent dispersibility in an aqueous medium and which has a relatively long pot life, a high binding property and a good self-curing property in the form of an aqueous dispersion.

Still another object of the present invention is to provide a powdery one-package inorganic binder composition which can give a bonded structure excellent in the water resistance and heat resistance.

A further object of the present invention is to provide a one-package inorganic binder composition which has an excellent storage stability though the composition comprises a binder component and a curing agent component in combination.

In accordance with the fundamental aspect of the present invention, there is provided a one-package inorganic binder composition comprising a powdery mixture of a powdery alkali metal silicate having a water solubility or water dispersibility, an alkali metal borate soluble in an alkaline aqueous solution and silicon polyphosphate.

The present invention is based on the finding that the above-mentioned powdery mixture of a powdery alkali metal silicate, an alkali metal borate and silicon polyphosphate is stably present in one package without loss of the water dispersiblity, binding property and self-curing property, when an aqueous medium is added to this powdery mixture, the above-mentioned premature gelation or partial gelation is not caused and the powdery mixture is easily and stably dispersed in the aqueous medium while showing an appropriate pot life, and the resulting aqueous dispersion is excellent in the binding property and self-curing property and gives a bonded structure prominently excellent in the water resistance and heat resistance.

DETAILED DESCRIPTION OF THE PREFERRED EMBODIMENTS

Figure 1:
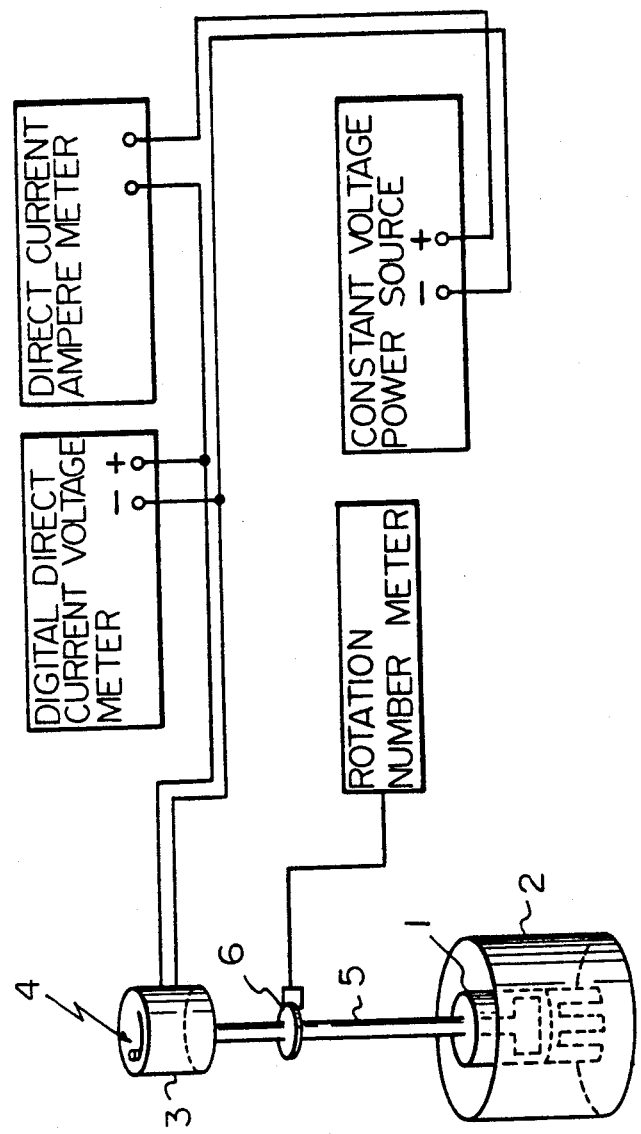
FIG. 1 is a diagram illustrating a gelation time measuring device used in Examples.

The powdery alkali metal silicate used in the present invention is indispensable for attaining a high binding property, and powdery silicon polyphosphate is indispensable for keeping a good balance between the storage stability due to the property of gradually releasing phosphoric acid and the curing action. The powdery alkali metal borate to be combined with the foregoing two components is effective for preventing premature gelation or partial gelation in the form of not only a powdery mixture with other two components but also an aqueous dispersion and improving the water resistance of the resulting bonded structure, as compared with a binder composition comprising the above-mentioned powdery alkali metal silicate and silicon polyphosphate alone. The reason for this excellent action has not completely been elucidated, but it is believed that the alkali metal borate is basic and retards neutralization of the alkali metal silicate by silicon polyphosphate and when curing is effected by silicon polyphosphate, the boric acid component uniformly reticulates the entire silicate binder and is effective for providing a homogeneous cured structure excellent in the water resistance.

As is seen from the foregoing description, it is important that the one-package binder composition of the present invention should comprise the powdery alkali silicate binder component, the silicon polyphosphate component having a property of gradually releasing phosphoric acid and the alkali metal borate component which is a weaker acid than phosphoric acid. Since these three components are contained in one package, the binder composition of the present invention is advantageous in that metering or mixing of these components is not necessary when the composition is finally used as a binder.

The powdery alkali metal silicate that is used in the present invention is water-soluble or water-dispersible, and one having an $M_2O/SiO_2$ molar ratio of from 1/1.3 to 1/2.6 is preferred (M stands for an alkali metal). When an alkali metal silicate in which the $M_2O/SiO_2$ molar ratio is outside the above range is used as the binder component, the bonding strength tends to be reduced. Sodium silicate is especially suitable for attaining the objects of the present invention, but potassium silicate may also be used. The alkali metal silicate that is used in the present invention may contain water of hydration, so far as the alkali metal silicate is powdery.

Any alkali metal borate can be used in the present invention, so far as it is soluble in an alkaline aqueous solution. For example, sodium borate and potassium borate are preferably used. The borate may be an anhydrous salt or a water-containing salt such as a trihydrate, pentahydrate, heptahydrate or decahydrate.

The silicon polyphosphate that is used in the present invention comprises a phosphoric acid component and a silica component as indispensable components, and the phosphoric acid component is contained in the condensed form. Silicon polyphosphate having a $P_2O_5/SiO_2$ molar ratio of from 1/1.8 to 1/3.6, especially from 1/2.0 to 1/3.3, is preferred. If the molar ratio of the phosphoric acid component ($P_2O_5$) is too low and below the above range, the desired curing property cannot be obtained and the mechanical strength is reduced, and if this molar ratio is too high and exceeds the above range, when the composition is formed into an aqueous dispersion, premature gelation or partial gelation is caused.

In order to prevent premature gelation or partial gelation and cure the alkali metal silicate binder uniformly and tightly, it is important that this silicon polyphosphate should have a property of gradually releasing the phosphoric acid component. In this connection, it is preferred that the initial dissolution quantity B, defined by the following formula, of the silicon polyphosphate that is used in the present invention be up to 250, particularly up to 200, especially particularly up to 100, and that the average hydrolysis speed constant A, defined by the following formula, of the silicon polyphosphate be at least 0.2, especially 0.3 to 1.3:

$$Y = AX + B$$

wherein X stands for the elapsed time (minutes), up to 120 minutes, of a sample solution formed by adding 1 g of the curing agent (silicon polyphosphate) in 100 ml of a 4 N aqueous solution of sodium hydroxide, and Y stands for the integrated amount (mg/100 ml) of phosphoric acid ($P_2O_5$) dissolved in the sample solution.

The process for the preparation of the gradually releasing phosphate type curing agent and the properties of this curing agent are described in detail in the above-mentioned specification of U.S. Pat. No. 4,018,616.

In the powdery binder composition of the present invention, it is preferred that the molar ratio of $B_2O_3$ in the alkali metal borate to $SiO_2$ in the powdery alkali metal silicate be in the range of from 1/0.03 to 1/0.3, especially from 1/0.05 to 1/0.25, and that the molar ratio of $P_2O_5$ in the silicon polyphosphate to the total alkali metal component ($M_2O$ in which M stands for an alkali metal) in the composition be in the range of from 1/0.35 to 1/0.85, especially from 1/0.3 to 1/0.8. If the molar ratio of the boric acid component ($B_2O_3$) is too low and below the above range, not only the water resistance is reduced, but also the stability is reduced, and even if the molar ratio of the boric acid component is increased beyond the above range, no particular advantage is attained and the composition becomes economically disadvantageous. If the amount of the phosphoric acid component in the silicon polyphosphate is too small and below the above range, curing is insufficient or a desired bonding strength cannot be obtained, and if the amount of the phosphoric acid component is too large and exceeds the above range, partial gelation or premature gelation is caused and the bonding strength and water resistance tend to be reduced.

In the powdery composition of the present invention, the particle size of each powdery component can be changed in a broad range. For example, since the powdery alkali metal silicate or alkali metal borate is easily soluble in water, it may have a considerably large particle size, so far as segregation is not caused. On the other hand, since the silicon polyphosphate is insoluble in water, it is preferred that the particle size of the silicon polyphosphate be smaller than 100 microns, especially smaller than 74 microns.

The one-package binder composition of the present invention may be prepared by dry-blending the above components at the above-mentioned ratio and, if necessary, lightly pulverizing or granulating the mixture. The resulting composition is packed in a moisture-proof paper bag, an aluminum foil-laminated packaging member or a transportation container.

The powdery composition of the present invention shows a prominently excellent storage stability in the moisture-intersected dry state. When at least one of the silicon polyphosphate and the alkali metal silicate-alkali metal borate mixture is coated in advance with an organic or silicate coating material soluble in an alkaline aqueous solution, even if the powdery composition is exposed to high humidity conditions, the composition shows an excellent storage stability over a very long period. Namely, this organic or silicate coating material prevents the silicon polyphosphate from having direct contact with the alkali metal silicate binder during the storage, and when the composition is dispersed in water, the organic or silicate coating material is dissolved in the alkaline liquid and does not inhibit the binding action of the alkali metal silicate or borate or the curing action of the silicon polyphosphate.

In view of the moisture-resistance storage property and from the economical viewpoint, it is preferred that the organic or silicate coating material be used in an amount of 4 to 12% by weight, especially 5 to 11% by weight, based on the silicon polyphosphate or the alkali metal silicate-alkali metal borate mixture.

An organic coating material which is rendered soluble by neutralization with an alkali and is relatively hydrophobic before neutralization and which shows a surface activating action (dispersibility improving action) when it is dissolved is preferably used. For example, higher fatty acids and resin acids such as stearic acid, palmitic acid, lauric acid and behenic acid are advantageously used. Furthermore, an alkali-soluble polymers such as a vinyl ether-maleic acid copolymer, an acrylic acid-acrylic acid ester copolymer, carboxymethyl cellulose, glue and casein can be used as the organic coating material.

As the silicate coating material, there can be used calcium silicate, magnesium silicate, barium silicate and ehter silicates.

The one-package inorganic binder composition of the present invention is mixed with an aqueous medium in an amount of 30 to 200 parts by weight, especially 35 to 90 parts by weight, per 100 parts by weight of the powdery composition, and the composition is applied to the intended use as the binder, though the preferred amount of the aqueous medium varies according to the intended use or the presence or absence of other additive components.

Various assistants and additives may be incorporated into the one-package inorganic binder composition in the package in advance or when the composition is applied to the intended use. For example, assistants such as a curing assistant and additives such as a reinforcer, an agrregate, a pigment, an anchoring agent and an initial tack imparting agent may be incorporated in the powdery composition of the present invention.

The inorganic binder composition of the present invention may be used singly or in combination with a known curing assistant. As the curing assistant, there can be mentioned, for example, metal oxides and hydroxides such as calcium oxide, magnesium oxide, zinc oxide, aluminum oxide, magnesium hydroxide, calcium hydroxide and aluminum hydroxide, metal silicofluorides such as aluminum silicofluoride, calcium silicofluoride and sodium silicofluoride, and metal phosphates such as aluminum phosphate and calcium phosphate.

A fibrous reinforcer such as a staple, sliver, mat, woven fabric, non-woven fabric or net of glass fiber, rock wook, slag wool, asbestos, talc, carbon fiber or metal fiber may be used as the reinforcer. Furthermore, a finely divided reinforcer such as carbon black, glass powder, white carbon or siliceous sand may be used. As the filler or coating material, there may be used inorganic fillers and aggregates such as calcium silicate, magnesium silicate, barium silicate, kaolin, sintered clay, acid clay, activated clay, silicon dioxide, aluminosilicic acid, its salts, titanium dioxide, zirconium dioxide, alumina powder, barium sulfate, magnesium carbonate, magnesium oxide, calcium carbonate, zinc oxide, gypsum, sand, rock, stone and refractory mineral. Moreover, an organic filler such as a powdery phenolic resin, a powdery urea resin or carboxymethyl cellulose may be used.

As the pigment, there can be used not only white pigments such as titanium dioxide and coloring pigments such as chrome yellow, red iron oxide, ultramarine, chrome green, mars violet and carbon black.

Acidic, neutral and basic refractory aggregates may be used according to the intended use. For example, there can be mentioned $Al_2O_3$-$SiO_2$ type aggregates such as chamotte, agalmatolite, mullite, semi-silica aggregate and high-alumina aggregate (pearlite), $SiO_2$ type aggregates such as siliceous stone, $Al_2O_3$ type aggregates such as corundum and electrofused alumina, MgO-$SiO_2$ type aggregates such as forsterite, SiC type aggregates such as silicon carbide, graphite type aggregates, chrome aggregates, chrom-magnesite aggregates, magnesia-chrome aggregates, magnesia clinker, electrofused magnesia and sintered dolomite. These refractory aggregates may be used singly or in the form of a mixture of two or more of them. The refractory aggregate is subjected to the known particle size adjustment treatment and a refractory composition in which the content of coarse particles having a particle size of 1 to 5 mm is 10 to 70% by weight and the content of fine particles having a particle size smaller than 1 mm is 90 to 30% by weight is formed by appropriately mixing fractions. Of course, the aggregate may directly be pulverized to obtain a particle size distribution similar to the above-mentioned particle size distribution and the pulverized aggregate may be used without performing classification or the like.

A paste or latex may be added to the powdery composition of the present invention to temporarily increase the initial tackiness of the aqueous dispersion.

The kinds and amounts of the above-mentioned additives should be selected so that the operation adaptability of the final binder composition is not degraded.

The binder composition of the present invention may be used for the production of various molded articles. For example, the binder composition of the present invention may be used in combination with a fibrous or finely divided reinforcer or filler and also with an aggregate as a binder, tackifier, adhesive or sticking agent for the production of various refractory molded structures such as roofing materials, interior and exterior decorative tiles, blocks, bricks, hollow wall members, partitioning materials, sound insulating materials, refractory coatings of iron materials for skyscrapers and other construction materials, furniture and fixtures such as tables and chairs table wares and other containers, various decorative articles, structural materials such as pipes, sheets, blocks, beams, columns and casings, various casting molds, definite and indefinite ceramic bricks and molded articlss of industrial wastes.

Furthermore, the binder composition of the present invention is effectively used as an adhesive for producing integrated articles or bonded structures by bonding various ceramic products such as glass articles, bricks, slates, blocks and porcelains or metallic articles.

Moreover, the binder composition of the present invention can valuably be used for the impregnation or surface treatment of bricks, porcelains, concrete products, gypsum boards, wooden articles, paper products and other fibrous products to render them incombustible or water-impermeable, or for formation of incombustible coatings on these articles.

Still further, the binder composition of the present invention may be coated as an inorganic paint on various structures directly or after addition of fillers or pigments if necessary.

In producing molded articles, bonded structures and coated structures by using the binder composition of the present invention, curing of the aqueous dispersion of the binder composition can be performed in the formal state or under application of heat and pressure. For example, the curing temperature is in the range of from room temperature to 200° C., especially from room temperature to 150° C. Curing is carried out under atmospheric pressure or under application of a pressure of up to about 10 Kg/cm². Ordinarily, curing is performed in air, but if desired, curing may be conducted under a reduced pressure or in an inert atmosphere such as a nitrogen gas atmosphere. Carbon dioxide gas may be used as the curing atmosphere so as to shorten the curing time.

An appropriate curing time is selected within a range of 2 minutes to 1 week according to the curing temperature adopted, though the preferred curing time varies depending on the temperature and the kinds and amounts of the curing agent and curing assistant. For example, in the case where the binder composition of the present invention is used as a coating composition, it is sufficient if curing is conducted for 2 to 10 minutes. In case of from temperature curing of a bonded structure or a thick molded article, it sometimes is necessary to conduct curing for about 1 week to obtain a cured product having a complete mechanical strength.

The present invention will now be described in detail with reference to the following Examples that by no means limit the scope of the invention.

EXAMPLE 1

Production of a powdery one-package inorganic binder will now be described.

1-1. Powdery Sodium Silicate:

Three commercially available powdery sodium silicates having a composition shown in Table 1 were used.

TABLE 1

| Composition (%) | Sample | | |
|---|---|---|---|
| | SS-1 | SS-2 | SS-3 |
| $SiO_2$ | 50.5 | 51.4 | 53.0 |
| $Na_2O$ | 34.3 | 25.0 | 22.1 |
| $SiO_2/Na_2O$ Molar Ratio | 1.52 | 2.12 | 2.48 |

1-2. Powdery Water-Soluble Borate:

Three alkaline aqueous solution-soluble borates having a molecular formula shown in Table 2 were used.

TABLE 2

| | Sample | | |
|---|---|---|---|
| | B-1 | B-2 | B-3 |
| Molecular Formula | $Na_2B_4O_7.10H_2O$ | $Na_2B_4O_7.5H_2O$ | $K_2B_4O_7.5H_2O$ |

1-3. Powdery Silicon Polyphosphate:

As the silicon polyphosphate, there were used 16 silicon polyphosphates prepared according to the methods disclosed in Japanese Patent Publications No. 40866/71 and No. 42711/71.

With reference to each of the so-prepared 16 silicon polyphosphates, the $SiO_2/P_2O_5$ molar ratio, the composition of other components (for example, $Al_2O_3$, CaO and MgO) introduced from the starting materials and the average hydrolysis constant (a) and initial hydrolysis quantity (b) (ml) determined according to the method described below are shown in Table 3.

Method for Determination of Average Hydrolysis Constant (a) and Initial Hydrolysis Quantity (b):

In 100 ml of pure water was dispersed 1 g of the sample powder, and a 0.1 N aqueous solution of sodium hydroxide (NaOH) was added to the dispersion so that the pH value of the dispersion was maintained at 10.5. The amount (ml) of the 0.1 N aqueous solution of sodium hydroxide consumed for a predetermined elapsed time (minute) was measured, and the time (minute) was plotted on the abscissa and the amount (ml) of the 0.1 N aqueous solution of sodium hydroxide consumed was plotted on the ordinate. The formula (1) of $Y = aX + b$ was determined from the obtained line, and the values of the average hydrolysis constant (a) and initial hydrolysis quantity (b) were obtained from the formula (1).

Typical instances of the method for the production of silicon polyphosphate will now be described with reference to samples H-1 and H-2.

Production of Sample H-1:

Commercially available sodium silicate of the industrial grade (sodium silicate No. 3 specified by JIS, $Na_2O = 9.63\%$, $SiO_2 = 28.9\%$, $SiO_2/Na_2O$ molar ratio = 3.1) was treated with a cation exchange resin to effect partial removal of sodium ions. The so-treated sodium silicate was diluted so that the concentration of the silicic acid component ($SiO_2$) of sodium silicate was 0.25 mol/l, and the dilution was contacted with the cation exchange resin to remove sodium ions so that the pH value of the sodium silicate solution was 10.0. The recovered sodium silicate solution having a pH value of 10.0 comprised 1.72 g/100 ml of $SiO_2$ and 0.091 g/100 ml of $Na_2O$ and had an $SiO_2/Na_2O$ molar ratio of 19.5. Commercially available phosphoric acid of the industrial grade (first grade specified by JIS, 85.0% $H_3PO_4$ having a specific gravity of 1.69) was mixed with the sodium silicate solution having a pH value of 10.0 so that the $SiO_2/P_2O_5$ molar ratio was 2.2, and the mixture was heated and concentrated with stirring to obtain a dry product. The dry product was pulverized and was calcined at 950° C. for 120 minutes in a rotary kiln. The calcined product was pulverized and classified by using a 200-mesh sieve to obtain powdery silicon polyphosphate (sample H-1).

Production of Sample H-2:

Easily reactive silicic acid was prepared from acid clay produced at Nakajo, Niigata, Japan (the dry product comprising 78.7% of $SiO_2$, 13.1% of $Al_2O_3$, 0.57% of $Fe_2O_3$, 3.50% of MgO, 1.13% of CaO and an ignition loss of 3.15%) according to the method disclosed in Japanese Patent Publication No. 2277/45. More specifically, 76.5 g, as calculated as the dry product, of the above acid clay (having a water content of 42.5%) was charged in a conical beaker having a capacity of 500 ml, and 200 ml of an aqueous solution of sulfuric acid having a concentration of about 50% was added and the acid treatment was carried out at 90° C. for 10 hours. The treated clay was washed with a dilute aqueous solution having a pH value of 1.0 according to the decantation method and then with water to remove the basic salts formed by the reaction. Thus, easily reactive silicic acid (the dry product comprising 92.46% of $SiO_2$, 2.68% of $Al_2O_3$, 0.24% of $Fe_2O_3$, 0.13% of MgO, 0.13% of CaO and 3.38% of an ignition loss), which was a special silica gel, was recovered from the acid clay. This easily reactive silicic acid was mixed with the above-mentioned phosphoric acid of the industrial grade so that the $SiO_2/P_2O_5$ molar ratio was 3.0, and the mixture was stirred and granulated to form granules having a diameter of about 0.5 to about 2 mm. The granulation product was calcined at 250° to 300° C. for about 30 minutes in a rotary kiln and subsequently calcined at about 700° C. for about 30 minutes. Then, the calcined product was pulverized by using a hammer mill type pulverizer (supplied by Tokyo Atomizer K.K.) and classified by using a 200-mesh sieve to obtain powdery silicon polyphosphate (sample S-2).

Other silicon polyphosphates shown in Table 3 were prepared according to the above-mentioned method adopted for production of sample H-1 or H-2 while changing the starting materials of the silicic acid and phosphoric acid components and the preparation conditions (such as the SiO$_2$/P$_2$O$_5$ molar ratio, the calcining temperature and time, the presence or absence of calcination and the pulverization method). Incidentally, when a component other than silicic acid (for example, more than 1% of Al$_2$O$_3$, CaO, MgO or the like) was contained in the starting material, the phosphoric acid component was added in an amount necessary for forming a normal salt with such basic component, as well as the phosphoric acid component added for reaction with silicic acid (SiO$_2$) at a predetermined molar ratio.

TABLE 3

| | Sample | | | | | |
|---|---|---|---|---|---|---|
| | H-1 | H-2 | H-3 | H-4 | H-5 | H-6 |
| Starting Materials | | | | | | |
| silicic acid component | sodium-removed sodium silicate | AS | AS | AS | AS | * |
| phosphoric acid component | PA | PA | PA | PA | PA | PA |
| other component | — | Al$_2$O$_3$, CaO, MgO | Al$_2$O$_3$, CaO, MgO | Al$_2$O$_3$, CaO, MgO | Al$_2$O$_3$, CaO, MgO | — |
| Preparation Conditions | | | | | | |
| SiO$_2$/P$_2$O$_5$ molar ratio | 2.2 | 3.0 | 2.0 | 2.5 | 3.5 | 3.0 |
| calcination | not effected | effected | effected | effected | effected | effected |
| calcining Temp. (°C.) | 950 | 700 | 700 | 700 | 700 | 700 |
| calcining time (min) | 120 | 30 | 30 | 30 | 30 | 30 |
| pulverization | atomizer | atomizer | atomizer | atomizer | atomizer | atomizer |
| Physical Property Values | | | | | | |
| average hydrolysis constant (a) | 0.035 | 0.026 | 0.031 | 0.029 | 0.015 | 0.030 |
| initial hydrolysis quantity (b) (ml) | 1.5 | 0.8 | 1.4 | 1.1 | 0.6 | 0.8 |

| | Sample | | | | | |
|---|---|---|---|---|---|---|
| | H-7 | H-8 | H-9 | H-10 | H-11 | H-12 |
| Starting Materials | | | | | | |
| silicic acid component | aluminum silicate | calcium silicate | magnesium silicate | zeolite 4A | silica gel powder | AS |
| phosphoric acid component | PA | PA | PA | PA | PA | pyrophosphoric acid |
| other component | Al$_2$O$_3$ | CaO | MgO | Na$_2$O, Al$_2$O$_3$ | 3% K$_2$O added | Al$_2$O$_3$, CaO, MgO |
| Preparation Conditions | | | | | | |
| SiO$_2$/P$_2$O$_5$ molar ratio | 3.0 | 3.0 | 3.0 | 3.0 | 3.0 | 3.0 |
| calcination | effected | effected | effected | effected | effected | effected |
| calcining temp. (°C.) | 700 | 700 | 700 | 700 | 700 | 700 |
| calcining time (min) | 30 | 30 | 30 | 30 | 30 | 30 |
| pulverization | atomizer | atomizer | atomizer | atomizer | atomizer | atomizer |
| Physical Property Values | | | | | | |
| average hydrolysis constant (a) | 0.013 | 0.020 | 0.017 | 0.024 | 0.022 | 0.033 |
| initial hydrolysis quantity (b) (ml) | 1.9 | 1.1 | 1.8 | 0.7 | 0.4 | 0.7 |

| | Sample | | | | | | |
|---|---|---|---|---|---|---|---|
| | H-13 | H-14 | H-15 | H-16 | HC-1 | HC-2 | HC-3 |
| Starting Materials | | | | | | | |
| silicic acid component | AS | AS | AS | AS | AS | AS | AS |
| phosphoric acid component | potassium phosphate | sodium phosphate | PA | PA | PA | PA | PA |
| other component | Al$_2$O$_3$, CaO, MgO, K$_2$O | Al$_2$O$_3$, CaO, MgO, Na$_2$O | Al$_2$O$_3$, CaO, MgO | Al$_2$O$_3$, CaO, MgO | Al$_2$O$_3$, CaO, MgO | Al$_2$O$_3$, CaO, MgO | Al$_2$O$_3$, CaO, MgO |
| Preparation Conditions | | | | | | | |
| SiO$_2$/P$_2$O$_5$ molar ratio | 2.2 | 2.2 | 3.0 | 3.0 | 3.0 | 3.0 | 3.0 |
| calcination | effected | effected | effected | effected | not effected | not effected | effected |
| calcining temp. (°C.) | 700 | 700 | 500 | 1000 | 400 | 1100 | 700 |
| calcining time (min) | 30 | 30 | 40 | 15 | 240 | 20 | 30 |
| pulverization | atomizer | atomizer | atomizer | atomizer | atomizer | atomizer | 120 minutes' pulverization in pot mill |
| Physical Property Values | | | | | | | |
| average hydrolysis constant (a) | 0.027 | 0.030 | 0.045 | 0.020 | 0.152 | — | 0.085 |
| initial hydrolysis | 0.5 | 1.2 | 2.2 | 0.2 | 3.2 | 12.0 | 6.2 |

TABLE 3-continued quantity (b) (ml)

Note
*commercially available silica gel powder of reagent grade
AS: easily reactive silicic acid prepared from acid clay
PA: phosphoric acid of the industrial grade
atomizer: hammer mill type pulverizer
HC: silicon phosphate other than silicon polyphosphate of the present invention Three comparative silicon phosphates (samples HC-1, HC-2 and HC-3) differing from the silicon polyphosphate of the present invention in the physical properties were prepared.

Each of the silicon polyphosphates was coated with a predetermined amount of a fatty acid (for example, beef-tallow stearic acid) or barium silicate at the pulverizing step using a hammer mill type pulverizer at about 80° C.

In the same manner as described above, each of the alkali metal silicate-alkali metal borates was coated with a fatty acid or barium silicate.

1-4. One-Package Inorganic Binder:

The powdery sodium silicate, alkali metal borate and silicon polyphosphate were homogeneously mixed to obtain an inorganic binder having a composition shown in Table 5, and a predetermined amount of water was added to the inorganic binder to form a homogenous paste. The bonding properties were tested according to methods described below to obtain results shown in Table 5.

It was found that better results were obtained when the compositions and mixing ratios of the powdery sodium silicate, alkali metal borate and silicon polyphsophate were as shown in Table 4.

TABLE 4

| | Molar Ratio |
|---|---|
| Composition of powdery sodium silicate | $SiO_2/Na_2O$ = 1.3 to 2.6 |
| Ratio of alkali metal borate to powdery sodium silicate | $B_2O_3/SiO_2$ = 0.03 to 0.3 |
| Composition of silicon polyphosphate | $SiO_2/P_2O_5$ = 1.8 to 3.6 |
| Ratio of silicon polyphosphate to total sodium component in binder composition | $P_2O_5/Na_2O$ = 0.35 to 0.85 |

The amount of the fatty acid coated on silicon polyphosphate was 10% by weight unless otherwise indicated. Other coating amounts are described in Example 2.

In order to evaluate the bonding effect of the inorganic binder of the present invention, the following tests concerning the bonding properties were carried out.

(A) Measurement of Dispersibility and Gelation Time:

An apparatus as shown in FIG. 1 was used for the measurement of the dispersibility and the gelation time.

A vessel 1 having an inner capacity of about 160 ml, which was secured in a water bath 2 maintained at a predetermined measurement temperature (40° C. unless otherwise indicated) was charged with 85 g of the sample powder, and 50 ml of water was added. A stirring vane 5 formed of stainless steel was put into the vessel and was rotated by a universal motor 3 (rated conditions: 100 V, 90 W, 4 poles, 50 Hz, 1.0 A, 3500 rpm) connected directly to the stirring vane. In advance, the voltage (direct current) was adjusted to 13.00 V in the state where the stirring vane was rotated under no load (any sample was not added in the vessel), and the rotation number was adjusted to 310 rpm under no load by a rotation adjusting knob 4 located in the upper portion of the motor while observing a rotation number meter. The torque T (Kg-m) under no load was calculated from the voltage, current and rotation number according to the following formula (2):

$$T(\text{Kg-m}) = 0.9737 \times \frac{V \times I}{N}$$

wherein N stands for the rotation number (rpm), V stands for the voltage (volt) and I stands for the current (A).

It was found that under no load, the torque T was in the range of from 0.016 to 0.020 Kg-m.

Water was added to the sample powder in the measuring vessel 1 and the stirring vane 5 was rotated to form a homogeneous paste. With the lapse of time, the viscosity of the paste was increased, the load current was increased, the rotation number was reduced, and the torque was hence increased. From the preliminary experiment results, the point at which the torque T was increased to 0.07 Kg-m was defined as the gelation point. The time required for arrival at this gelation point was checked and defined as the gelation time.

For ordinary inorganic binders and the binder of the present invention, it is necessary that this gelation time should be more than 100 minutes at 20° C. and more than 30 minutes at 40° C.

When water was added to the sample powder and stirring was initiated, if the entire sample was formed into a homogeneous paste, it was judged that the dispersibility was good, and if an undissolved lump was formed or a heterogeneous state was produced when stirring was initiated, it was judged that the dispersibility was bad. Of course, a sample having a bad dispersibility cannot be a binder of the present invention.

(B) Water Resistance:

A product obtained by curing the paste in which the gelation time had been measured according to the above-mentioned method (A) was allowed to stand still at room temperature for 4 days, and the cured product was thrown into water and when a change of the shape such as cracking or breaking was not observed even after passage of at least 24 hours, it was judged that the sample had a water resistance. In other case, it was judged that the sample had no water resistance.

(C) Bonding Force:

The bonding force was tested according to the method of JIS K-6852. At first, a steel plate and an asbestos plate having a thickness of 0.5 cm were cut into rectangular test plates having a size of 30 cm×25 cm. The surface to be bonded of the steel plate was polished with abrasive paper #240 until the metallic luster was observed, and the polished surface was washed with trichloroethylene and dried.

An adhesive paste having a composition shown below was coated in a thickness of about 2 mm over an area of 25 cm×25 cm on the rectangular asbestos test plate, and the rectangular steel test plate was placed on the coated asbestos plate and bonded thereto over an area of 25 cm×25 cm so that the non-bonded ear portions (5 cm×25 cm) were located on both the opposite sides and the adhesive paste did not protrude from the bonded area. Six test pieces were prepared for each adhesive paste, and the compression strength test was conducted under the following three conditions: (1) the test piece was allowed to stand at room temperature (10° to 30° C.) for 3 days and the strength was measured (normal state strength), (2) the test piece described in (1) above was thrown into water (25° C.) and taken out after passage of 24 hours, and the strength was measured in the state where water adhered to the test piece (water-resistant strength), and (3) the test piece described in (1) above was exposed to a predetermined temperature and the strength was measured (heat-resistant strength).

The strength was determined by using a compression breakdown strength tester. More specifically, both the ear portions of the bonded test piece were erected and a pressure was applied thereto, and compression was conducted until the bonded surface or the asbestos plate was broken down. The load (Kg/mm$^2$) applied to the test piece until the bonded surface or asbestos plate was broken down was measured, and the normal state, water-resistant or heat-resistance bonding strength was determined from the measured load.

TABLE 5

| Run No. | 5-1 | 5-2 | 5-3 | 5-4 | 5-5 | 5-6 | 5-7 | 5-8 | 5-9 | 5-10 |
|---|---|---|---|---|---|---|---|---|---|---|
| Powdery Sodium Silicate | | | | | | | | | | |
| kind | SS-1 | SS-2 | SS-3 | SS-2 | SS-2 | SS-2 | SS-2 | SS-2 | SS-2 | SS-2 |
| amount (g) | 100 | 100 | 100 | 100 | 100 | 100 | 100 | 100 | 100 | 100 |
| Alkali Metal Borate | | | | | | | | | | |
| kind | B-2 | B-2 | B-2 | B-1 | B-3 | B-2 | B-2 | B-2 | B-2 | B-2 |
| amount (g) | 10 | 10 | 10 | 10 | 10 | 4 | 6 | 15 | 30 | 10 |
| Silicon Polyphosphate | | | | | | | | | | |
| kind | H-2 | H-2 | H-2 | H-2 | H-2 | H-2 | H-2 | H-2 | H-2 | H-1 |
| amount (g) | 70 | 70 | 70 | 70 | 70 | 70 | 70 | 100 | 120 | 70 |
| Amount (g) of Water Added | 100 | 100 | 100 | 100 | 100 | 100 | 100 | 120 | 140 | 100 |
| Dispersibility | good | good | good | good | good | good | good | good | good | good |
| Gelation Time (min) (torque = 0.07 Kg-m) | 34 | 36 | 39 | 36 | 34 | 35 | 34 | 37 | 38 | 36 |
| Water Resistance | good | good | good | good | good | good | good | good | good | good |
| Bonding Force (Kg/cm$^2$) | | | | | | | | | | |
| normal state | 78 | 82 | 83 | 79 | 76 | 55 | 65 | 82 | 84 | 80 |
| water-resistant | 18 | 20 | 22 | 18 | 22 | 10 | 13 | 21 | 23 | 19 |

| Run No. | 5-11 | 5-12 | 5-13 | 5-14 | 5-15 | 5-16 | 5-17 | 5-18 | 5-19 | 5-20 |
|---|---|---|---|---|---|---|---|---|---|---|
| Powdery Sodium Silicate | | | | | | | | | | |
| kind | SS-2 | SS-2 | SS-2 | SS-2 | SS-2 | SS-2 | SS-2 | SS-2 | SS-2 | SS-2 |
| amount (g) | 100 | 100 | 100 | 100 | 100 | 100 | 100 | 100 | 100 | 100 |
| Alkali Metal Borate | | | | | | | | | | |
| kind | B-2 | B-2 | B-2 | B-2 | B-2 | B-2 | B-2 | B-2 | B-2 | B-2 |
| amount (g) | 10 | 10 | 10 | 10 | 10 | 10 | 10 | 10 | 10 | 10 |
| Silicon Polyphosphate | | | | | | | | | | |
| kind | H-2 | H-2 | H-2 | H-3 | H-4 | H-5 | H-6 | H-7 | H-8 | H-9 |
| amount (g) | 110 | 85 | 51 | 70 | 70 | 70 | 70 | 70 | 70 | 70 |
| Amount (g) of Water Added | 120 | 110 | 90 | 100 | 100 | 100 | 100 | 100 | 100 | 100 |
| Dispersibility | good | good | good | good | good | good | good | good | good | good |
| Gelation Time (min) (torque = 0.07 Kg-m) | 32 | 34 | 37 | 35 | 37 | 38 | 32 | 33 | 34 | 32 |
| Water Resistance | good | good | good | good | good | good | good | good | good | good |
| Bonding Force (Kg/cm$^2$) | | | | | | | | | | |
| normal state | 88 | 86 | 62 | 80 | 79 | 76 | 71 | 69 | 72 | 68 |
| water-resistant | 26 | 24 | 13 | 18 | 18 | 17 | 12 | 11 | 24 | 20 |

| Run No. | 5-21 | 5-22 | 5-23 | 5-24 | 5-25 | 5-26 | 5-27 | 5-28 | 5-29 |
|---|---|---|---|---|---|---|---|---|---|
| Powdery Sodium Silicate | | | | | | | | | |
| kind | SS-2 | SS-2 | SS-2 | SS-2 | SS-2 | SS-2 | SS-2 | SS-2 | SS-2 |
| amount (g) | 100 | 100 | 100 | 100 | 100 | 100 | 100 | 100 | 100 |
| Alkali Metal Borate | | | | | | | | | |
| kind | B-2 | B-2 | B-2 | B-2 | B-2 | B-2 | B-2 | B-2 | B-2 |
| amount (g) | 10 | 10 | 10 | 10 | 10 | 10 | 10 | 10 | 10 |
| Silicon Polyphosphate | | | | | | | | | |
| kind | H-10 | H-11 | H-12 | H-13 | H-14 | H-15 | H-16 | H-2 | H-2 |
| amount (g) | 70 | 70 | 70 | 70 | 70 | 70 | 70 | 70 | 70 |
| Amount (g) of Water Added | 100 | 100 | 100 | 100 | 100 | 100 | 100 | 65 | 130 |
| Dispersibility | good | good | good | good | good | good | good | good | good |
| Gelation Time (min) (torque = 0.07 Kg-m) | 29 | 31 | 35 | 36 | 36 | 34 | 34 | 22 | 39 |
| Water Resistance | good | good | good | good | good | good | good | good | good |
| Bonding Force (Kg/cm$^2$) | | | | | | | | | |
| normal state | 64 | 68 | 81 | 83 | 84 | 77 | 80 | 88 | 55 |
| water-resistant | 10 | 12 | 22 | 22 | 22 | 18 | 20 | 25 | 23 |

| Run No. | 5-C1 (comparison) | 5-C2 (comparison) | 5-C3 (comparison) | 5-C4 (comparison) | 5-C5 (comparison) | 5-C6 (comparison) |
|---|---|---|---|---|---|---|
| Powdery Sodium Silicate | | | | | | |

TABLE 5-continued

| kind | SS-2 | SS-2 | SS-2 | SS-2 | SS-2 | SS-2 |
|---|---|---|---|---|---|---|
| amount (g) | 100 | 100 | 100 | 100 | 100 | 100 |
| Alkali Metal Borate | | | | | | |
| kind | B-2 | B-2 | B-2 | B-2 | B-2 | B-2 |
| amount (g) | 0 | 2 | 10 | 10 | 10 | 10 |
| Silicon Polyphosphate | | | | | | |
| kind | H-2 | H-2 | HC-1 | HC-2 | HC-3 | H-2 |
| amount (g) | 70 | 70 | 70 | 70 | 70 | 40 |
| Amount (g) of Water Added | 100 | 100 | 100 | 100 | 100 | 90 |
| Dispersibility | good | good | bad | bad | bad | good |
| Gelation Time (min) (torque = 0.07 Kg-m) | 34 | 35 | 15 | 5 | 4 | 40 |
| Water Resistance | no (breakdown) | no (breakdown) | no | no | no | no |
| Bonding Force (Kg/cm$^2$) | | | | | | |
| normal state | 76 | 77 | 22 | 8 | 5 | 40 |
| water-resistant | 0 | 0 | 0 | 0 | 0 | 0 |

From the foregoing results, it will readily be understood that an adhesive composed of a homogeneous prepared by adding a predetermined amount of water to a one-package type powdery mixture comprising powdery sodium silicate, an alkali metal borate soluble in an alkaline aqueous solution and silicon polyphosphate has a water resistance and shows a high bonding force under various conditions, and that this adhesive is much superior to comparative adhesives in the water-resistance bonding strength.

EXAMPLE 2

The method for improving the shelf life of a powdery one-package type inorganic binder will now be described.

When powdery sodium silicate containing a large amount of sodium ions and powdery silicon polyphosphate containing a large amount of phosphoric acid ions are mixed and stored in one package, reaction is caused between the acid and alkali metal components by the moisture in air before the intended bonding effect is exerted, whereby the bonding effect is reduced. As means for preventing occurrence of this undesirable phenomenon, theee was adopted a method in which stearic acid, which is a kind of a fatty acid, or barium silicate were selected as a coating agent for the powdery silicon polyphosphate, and stearic acid or barium silicate were mixed with and coated on the powdery silicon polyphosphate to impart a water-repelling property to the powdery silicon polyphosphate.

The mixed powder was exposed to certain relative humidity conditions, and the effect of improving the moisture resistance of silicon polyphosphate and the bonding effect of the mixed powder as a one-package adhesive were examined to obtain results shown in Table 6.

The composition of Run No. 5-2 described in Example 1 was selected as the standard one-package inorganic binder composition. More specifically, a mixture of 100 g of powdery sodium silicate SS-2, 10 g of sodium borate B-2 and 70 g of silicon polyphosphate H-2 was used as the standard binder composition. In silicon polyphosphate H-2, the amount coated of stearic acid was 10%, but in this Example, the amount coated of stearic acid was adjusted to 0, 3, 5, 10 or 12%, and the amount coated of barium silicate was adjusted to 0, 5 or 12%.

Water was added in an amount of 100 g to 180 g of the binder composition, and the mixture was stirred to form a homogeneous paste.

In order to evaluate the resistance of the shelf life to water contained in air, the sample was allowed to stand under certain relative humidity conditions and also allowed to stand at room temperature.

In the former test method, the powdery sample was allowed to stand in a dessicator maintained at a temperature of 20° C. and a relative humidity of 60% for a week. Then, the sample was taken out and the bonding effect was evaluated.

In the latter test method, the powdery sample was filled in a paper bag and allowed to stand at a laboratory of the Technical Department, Mizusawa Plant, Mizusawa Industrial Chemicals, Ltd., residing at 21, Aza Tonoda, Oaza Nishime, Tsuruoka-shi, Yamagata-ken, Japan for 6 months from Dec. 1, 1980 to May 31, 1981, and then, the sample was taken out and the bonding effect was evaluated.

TABLE 6

| | Run No. | | | | | | |
|---|---|---|---|---|---|---|---|
| | 6-1 | 6-2 | 6-3 | 6-4 | 6-5 | 6-6 | 6-7 |
| Amount (%) of Coating Material | 0 | stearic acid 3 | stearic acid 5 | stearic acid 10 | stearic acid 12 | barium silicate 5 | barium silicate 12 |
| Dispersibility | | | | | | | |
| just after mixing | good | good | good | good | good | good | good |
| 20° C., 60% | bad | bad | good | good | good | good | good |
| room temp., 6 months | bad | bad | good | good | good | good | good |
| Gelation Time (min) | | | | | | | |
| just after mixing | 35 | 35 | 36 | 39 | 40 | 37 | 40 |
| 20° C., 60% | 15 | 25 | 33 | 36 | 37 | 35 | 38 |
| room temp., 6 months | 15 | 30 | 34 | 37 | 38 | 35 | 38 |
| Water Resistance | | | | | | | |
| just after mixing | good | good | good | good | good | good | good |
| 20° C., 60% | no | no | good | good | good | good | good |
| room temp., 6 months | no | no | good | good | good | good | good |

TABLE 6-continued

|  | Run No. | | | | | | |
| --- | --- | --- | --- | --- | --- | --- | --- |
|  | 6-1 | 6-2 | 6-3 | 6-4 | 6-5 | 6-6 | 6-7 |
| Bonding Strength (Kg/cm$^2$) (normal state) | | | | | | | |
| just after mixing | 84 | 82 | 80 | 80 | 75 | 80 | 78 |
| 20° C., 60% | 45 | 62 | 75 | 80 | 75 | 80 | 78 |
| room temp., 6 months | 30 | 60 | 76 | 80 | 75 | 80 | 78 |

From the foregoing results, it will readily be understood that a powdry mixture of silicon polyphosphate not coated with stearic acid or barium silicate and sodium silicate and sodium borate shows a sufficient bonding effect just after mixing but with the lapse of time, the bonding effect is reduced by the influence of water contained in the atmosphere. It will also be understood that an adhesive composition comprising powdery silicon polyphosphate coated with stearic acid or barium silicate has a good shelf life if the amount coated of coating material is 4 to 12%.

EXAMPLE 3

Results obtained when the one-package inorganic binder was used as agents other than the adhesive will now be described.

A. Binder for High Temperature Refractory Material:

A so-called magnesia brick was prepared as an example of a repairing material for a high temperature refractory material or high temperature structure of a definite or indefinite shape by using the inorganic binder of the present invention.

The powdery magnesia aggregate used had the following composition:

| | |
| --- | --- |
| Natural magnesia clinker (smaller than 1 mm) | 61% by weight |
| Natural magnesia clinker (1 to 5 mm) | 6% by weight |
| Sea water magnesia clinker (passing through 200-mesh sieve) | 28% by weight |
| Asbestos | 1% by weight |
| Kibushi clay (passing through 20-mesh sieve) | 4% by weight |

To 100 parts by weight of the above aggregate was added to 20 parts by weight of the one-package inorganic binder (sample of Run No. 5-2 described in Example 1, which comprised 100 parts of SS-2, 10 parts of B-2 and 70 parts of H-2), and 12 parts by weight of water was further added. The mixture was sufficiently stirred and filled in a round mold frame (30 mm in diameter and about 30 mm in height), and the mixture was compression-molded under a pressure of 10 Kg/cm$^2$. The so-formed test piece for determination of the normal state strength was removed from the mold frame. Then, the test piece was heated and dried in an oven maintained at 200° C. for 4 hours. Then, the test piece was naturally cooled to obtain a columnar test piece for determination of the strength under heating (30 mm in diameter and about 30 mm in height). The compression strength (Kg/cm$^2$) of each test piece was measured.

For comparison, 20 parts by weight of commercially available water glass (sodium silicate No. 3 specified by JIS, SiO$_2$ concentration = 25%) or 20 parts by weight of powdery aluminum primary phosphate (Al$_2$O$_3$.3-P$_2$O$_5$.3H$_2$O) was similarly added as the binder, and a columnar test piece was compression-molded in the same manner as described above and the compression strength was determined.

The obtained results are shown in Table 9.

B. Cold or Hot Adhesive for High Temperature Refractory Material:

A basic magnesia brick was selected and used as a high temperature refractory material base.

An adhesive having a composition shown in Table 7 was selected and used as cold or hot adhesive for this basic magnesia brick base.

TABLE 7

| | |
| --- | --- |
| Aggregate (powdery natural magnesia powder passing through 200-mesh sieve) | 100 parts by weight |
| Binder composition of present invention | 100 parts by weight |
| Flux [powdery Mg(OH)$_2$] | 5 parts by weight |

The binder composition of the present invention shown in Table 7 comprised 100 parts by weight of powdery sodium silicate SS-2, 10 parts by weight of sodium borate B-2, 70 to 120 parts by weight of silicon polyphosphate H-2 and 80 to 110 parts by weight of water.

The above ingredients were sufficiently mixed to form a homogeneous paste. When the composition was used as the cold adhesive, the paste was coated in a thickness of about 1 mm on a base brick test piece at room temperature, and another base brick test piece was placed on the coating to form a sandwich structure and effect bonding. After passage of 24 hours, the structure was exposed to 1400° C. for at least 15 minutes and naturally cooled to room temperature, and the bonding strength was measured according to the above-mentioned method for determination of the compression strength.

When the composition was used as the hot adhesive, a base brick test piece was placed in an electric furnace maintained at 1400° C. to heat the test piece at 1400° C. In the same manner as described above with reference to the cold adhesive, the adhesive paste was coated on another test piece, and the coated surface of the test piece was bonded to the test piece heated at 1400° C. in the electric furnace in the horizontal posture. After passage of at least 15 minutes, the bonded structure was vertically erected. If the bonded test piece did not fall down and was kept bonded, the bonded structure was kept in the horizontal posture again and secured in this state. A platinum-rhodium wire was attached to the upper test piece and a spring balance was attached to the other test piece. The bonded test piece was pulled together with the spring balance, and the bonding strength at fracture of the bonded surface was measured from a scale of the spring balance.

The obtained results are shown in Table 9.

For comparison, the same commercially available water glass (No. 3 specified by JIS) and powdery aluminum primary phosphate as described above were used.

and the cold bonding strength and hot bonding strength were similarly measured. The obtained results are shown in Table 9.

C. Inorganic Paint:

An inorganic paint paste of the present invention having a composition shown in Table 8 was coated in a thickness of about 0.5 mm on steel and asbestos test pieces (same as described above with reference to the method for determination of the bonding strength), and the coated test pieces were allowed to stand still at room temperature (about 20° C.) for one week and dipped in running water for 200 hours, and the coated surfaces were examined. When the state of the coated surface was not substantially different from the state before the treatment, it was judged that the water resistance was "good". When blister, scar or rust was observed on the coated surface, it was judged that the water resistance was "bad" and the sample could not practically be used.

The obtained results are shown in Table 9.

TABLE 8

| | |
|---|---|
| Powdery sodium silicate SS-2 | 100 parts by weight |
| Sodium borate B-2 | 10 parts by weight |
| Silicon polyphosphate H-2 | 40 parts by weight |
| Asbestos | 20 parts by weight |
| Pigment (titanium oxide) | 60 parts by weight |
| Water | 200 parts by weight |

TABLE 9

| Binder (8-1) | Composition (parts by weight) | | Normal State Strength (Kg/cm$^2$) | Strength under Heating (Kg/cm$^2$) |
|---|---|---|---|---|
| present invention | SS-2 B-2 H-2 | 100 10 70 | 560 | 2100 |
| comparison | water glass | | 420 | 1030 |
| comparison | aluminum phosphate | | 430 | 760 |

| Cold or Hot Adhesive (8-2) | Composition (parts by weight) | | Cold → Hot Strength (Kg/cm$^2$) | Hot Strength (Kg/cm$^2$) |
|---|---|---|---|---|
| present invention | SS-2 B-2 H-2 | 100 10 120 | 82.0 | 24.7 |
| comparison | water glass | | 0 | 0 |
| comparison | aluminum phosphate | | 0 | 0 |

| Inorganic Paint (8-3) | Composition (parts by weight) | | After 200 Hours' Dipping |
|---|---|---|---|
| present invention | SS-2 B-2 H-2 | 100 10 40 | good |
| comparison | water glass | | bad |
| comparison | aluminum phosphate | | bad |

From the foregoing results, it will readily be understood that the one-package inorganic binder composition of the present invention can effectively be used as a molding binder for a high temperature refractory material, a cold or hot adhesive for a high temperature refractory material and an inorganic paint.

EXAMPLE 4

An embodiment in which an inorganic or organic assistant is added to the one-package inorganic binder of the present invention will now be described.

Commercially available reagents and industrial chemicals shown in Table 10 were selected and used as powdery assistants.

TABLE 10

| Sample No. | Assistant |
|---|---|
| 10-1 | calcium silicate (CaSiO$_3$) |
| 10-2 | calcium phosphate (3CaO.P$_2$O$_5$) |
| 10-3 | aluminum phosphate (Al$_2$O$_3$.3P$_2$O$_5$.3H$_2$O) |
| 10-4 | sodium silicofluoride (Na$_2$SiF$_6$) |
| 10-5 | aluminum hydroxide [Al(OH)$_3$] |
| 10-6 | magnesium hydroxide [Mg(OH)$_2$] |
| 10-7 | asbestos |
| 10-8 | talc |
| 10-9 | powdery phenolic resin (resol type) |
| 10-10 | powdery urea resin |

The mixing ratio (parts by weight), the intended use and the effect of each assistant are shown in Table 11.

The effects in the respective uses were evaluated according to the methods described in Examples 1 through 3. The respective ingredients of the inorganic binder composition of the present invention were as shown in the preceding Tables.

TABLE 11

| Run No. | Use | Inorganic Binder and Composition (parts by weight) | | Assistants and Amounts (parts by weight) | | Effect |
|---|---|---|---|---|---|---|
| 11-1 | normal temperature curing type water-resistant adhesive | SS-2 B-2 H-2 | 50 6 26 | calcium silicate calcium phosphate sodium silicofluoride | 3 3 12 | water-resistant bonding strength of 42 Kg/cm$^2$ |
| 11-2 | normal temperature curing type water-resistant adhesive | SS-2 B-2 H-2 | 50 7 30 | calcium silicate calcium phosphate sodium silicofluoride aluminum hydroxide talc asbestos | 3 3 12 6 12 6 | water-resistant bonding strength of 60 Kg/cm$^2$ |
| 11-3 | heat-curing type water-resistant adhesive | SS-2 B-2 H-2 | 50 7 30 | sodium silicofluoride calcium silicate | 18 2 | gelation time of 45 minutes and water-resistant bonding strength of 65 Kg/cm$^2$ |
| 11-4 | anti-oxidant type binder for high temperature material | SS-2 B-2 H-2 | 40 4 35 | phenolic resin | 70 | effective for prevention of oxidation at 800–1000° C. |
| 11-5 | anti-oxidant type binder for high temperature material | SS-2 B-2 H-2 | 40 3 35 | urea resin | 70 | effective for prevention of oxidation at 800–1000° C. |
| 11-6 | hot adhesive | SS-2 B-2 | 50 5 | magnesium hydroxide aluminum phosphate | 10 10 | hot strength of 29.0 Kg/cm$^2$ |

TABLE 11-continued

| Run No. | Use | Inorganic Binder and Composition (parts by weight) | Assistants and Amounts (parts by weight) | Effect |
|---------|-----|---------------------------------------------------|------------------------------------------|--------|
|         |     | H-2    50                                         |                                          |        |

From the foregoing results, it will readily be understood that when an inorganic or organic assistant is added to the inorganic binder of the present invention according to the intended use (for example, as a water-resistant adhesive, a binder or a hot adhesive), the bonding effect can further be enhanced.

The combinations of the assistants shown in this Example are given only by way of example, and as is obvious to those skilled in the art, various modifications and changes may be made to these combinations.

What is claimed is:

1. A one-package inorganic binder composition comprising a powdery mixture of a powdery alkali metal silicate having a water solubility or water dispersibility, an alkali metal borate soluble in an alkaline aqueous solution and silicon polyphosphate.

2. A composition as set forth in claim 1, wherein the powdery alkali metal silicate has an $M_2O/SiO_2$ molar ratio of from 1/1.3 to 1/2.6 in which M stands for an alkali metal.

3. A composition as set forth in claim 1, wherein the silicon polyphosphate has a $P_2O_5/SiO_2$ molar ratio of from 1/1.8 to 1/3.6.

4. A composition as set forth in claim 1, wherein the silicon polyphosphate has an initial dissolution quantity B, defined by the following formula, of up to 250 and an average hydrolysis speed constant A, defined by the following formula, of at least 0.2:

$$Y \times AX + B$$

wherein X stands for the elapsed time (minutes), up to 120 minutes, of a sample solution formed by adding 1 g of the curing agent (silicon polyphosphate) in 100 ml of a 4 N aqueous solution of sodium hydroxide, and Y stands for the integrated amount (mg/100 ml) of phosphoric acid ($P_2O_5$) dissolved in the sample solution.

5. A composition as set forth in claim 1, wherein the molar ratio of $B_2O_3$ in the alkali metal borate to $SiO_2$ in the powdery alkali metal silicate is in the range of from 1/0.03 to 1/0.3 and the molar ratio of $P_2O_5$ in the silicon polyphosphate to the total alkali metal component $M_2O$ in the total composition, in which M stands for an alkali metal, is in the range of from 1/0.35 to 1/0.85.

6. A composition as set forth in claim 1, wherein at least one of the silicon polyphosphate and the alkali metal silicate-alkali metal borate mixture is coated with an organic coating material soluble in an alkaline aqueous solution.

7. A composition as set forth in claim 6, wherein the organic or silicate coating material is present in an amount of 4 to 12% by weight based on said silicon polyphosphate or mixture.

8. A composition as set forth in claim 6, wherein the organic coating material is a higher fatty acid.

* * * * *

UNITED STATES PATENT AND TRADEMARK OFFICE
CERTIFICATE OF CORRECTION

PATENT NO. : 4,415,364
DATED : November 15, 1983
INVENTOR(S) : Hiroyuki Naito, Takashi Maruya, Masaki Sugawara It is certified that error appears in the above—identified patent and that said Letters Patent is hereby corrected as shown below:

Claim 4, column 22, line 11, change "YxAX+B" to --Y=AX+B--.

Signed and Sealed this

Twenty-seventh Day of March 1984

[SEAL]

Attest:

GERALD J. MOSSINGHOFF

*Attesting Officer*  *Commissioner of Patents and Trademarks*